United States Patent
Mason et al.

(10) Patent No.: US 7,761,516 B2
(45) Date of Patent: Jul. 20, 2010

(54) SYSTEM AND METHOD FOR E-MAIL PRESENCE CONFIRMATION

(75) Inventors: Andrew Mason, Sunnyvale, CA (US); William J. Beyda, Cupertino, CA (US); Rami Caspi, Sunnyvale, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1066 days.

(21) Appl. No.: 10/383,800

(22) Filed: Mar. 6, 2003

(65) Prior Publication Data

US 2004/0177118 A1    Sep. 9, 2004

(51) Int. Cl.
    *G06F 15/16*    (2006.01)
(52) U.S. Cl. ............ 709/206; 709/203; 709/204; 709/205; 709/207
(58) Field of Classification Search ............ 709/203, 709/204, 205, 206, 207
    See application file for complete search history.

(56) References Cited

U.S. PATENT DOCUMENTS

| | | | |
|---|---|---|---|
| 5,790,649 A | 8/1998 | Hiroshige | |
| 6,438,585 B2* | 8/2002 | Mousseau et al. | 709/206 |
| 6,442,593 B1* | 8/2002 | Wang et al. | 709/206 |
| 6,502,128 B1 | 12/2002 | Kumpf | |
| 6,677,968 B1 | 1/2004 | Appelman | |
| 6,959,324 B1 | 10/2005 | Kubik et al. | |
| 7,111,044 B2 | 9/2006 | Lee | |
| 7,272,625 B1 | 9/2007 | Hannel et al. | |
| 2002/0021307 A1* | 2/2002 | Glenn et al. | 345/753 |
| 2002/0042830 A1* | 4/2002 | Bose et al. | 709/230 |
| 2002/0065894 A1 | 5/2002 | Dalal et al. | |
| 2002/0083127 A1 | 6/2002 | Agrawal | |
| 2002/0083136 A1 | 6/2002 | Whitten, II | |
| 2002/0129052 A1 | 9/2002 | Glazer et al. | |
| 2002/0178231 A1 | 11/2002 | Matsa et al. | |
| 2003/0023691 A1* | 1/2003 | Knauerhase | 709/206 |
| 2003/0055983 A1 | 3/2003 | Callegari | |
| 2003/0101343 A1* | 5/2003 | Eaton et al. | 713/170 |
| 2003/0120732 A1 | 6/2003 | Couts et al. | |
| 2003/0204721 A1 | 10/2003 | Barrus et al. | |
| 2003/0236847 A1* | 12/2003 | Benowitz et al. | 709/206 |
| 2004/0059781 A1 | 3/2004 | Yoakum et al. | |
| 2004/0122901 A1 | 6/2004 | Sylvain | |

FOREIGN PATENT DOCUMENTS

| | | |
|---|---|---|
| EP | 0 999 509 | 5/2000 |
| EP | 1 102 443 | 5/2001 |
| WO | WO 01/17165 | 3/2001 |

\* cited by examiner

*Primary Examiner*—Thu Nguyen
*Assistant Examiner*—Thomas J Dailey (57) ABSTRACT

A telecommunications system includes a plurality of electronic messaging clients (122); at least one messaging server (104) having an e-mail presence activation module (114) adapted to receive an e-mail and determine therefrom whether a presence of a recipient is to be determined, and a presence module (215) responsive to controls from the e-mail presence activation module and adapted to determine a presence of a recipient of said e-mail prior to sending the e-mail to the recipient. In one embodiment, the e-mail presence activation module (114) is adapted to read a priority level of the e-mail message to determine whether to check a presence of the recipient.

30 Claims, 7 Drawing Sheets

SYSTEM AND METHOD FOR E-MAIL PRESENCE CONFIRMATION

CROSS REFERENCE TO RELATED APPLICATIONS

This application is related to co-pending application U.S. Ser. No. 10/384,206, titled SYSTEM AND METHOD FOR PRESENCE ENABLED EMAIL DELIVERY, filed concurrently herewith.

FIELD OF THE INVENTION

The present invention relates to telecommunications systems and, in particular, to an improved system and method for delivery of electronic messages.

BACKGROUND OF THE INVENTION

Electronic messaging, or e-mail, has rapidly become an essential business and personal tool. However, typical e-mail systems are disadvantageous in that they provide no way to ensure that a recipient of an e-mail is actually present to receive it.

In general, e-mail messages may not be of particular importance, and therefore it may not matter much if the message sits unopened on a recipient's computer. However, some messages may be of sufficient sensitivity that there could be a security or other risk in leaving them sitting unopened on a recipient's computer.

For example, a recipient may not necessarily want an e-mail of a personal nature to be available for casual perusal by someone with access to the computer. Similarly, a personnel supervisor may have a secretary monitor his e-mail while he is away. The supervisor might not want the secretary to view an e-mail containing complaints about other personnel. In other cases, the sender may deem an e-mail of sufficient import that wants it to appear prominently at the recipient's mailbox and not "buried" in spam.

As such, there is a need for a system and method for preventing viewing of an e-mail by a third party. There is a further need for a system and method for ensuring that an e-mail recipient is present to receive an e-mail before it is sent.

SUMMARY OF THE INVENTION

These and other drawbacks in the prior art are overcome in large part by a system and method according to embodiments of the present invention.

A telecommunications system according to an embodiment of the present invention includes a plurality of electronic messaging clients; at least one messaging server having an e-mail presence activation module adapted to receive an e-mail and determine therefrom whether a presence of a recipient is to be determined, and a presence module responsive to controls from the e-mail presence activation module and adapted to determine a presence of a recipient of said e-mail prior to sending the e-mail to the recipient. In one embodiment, the e-mail presence activation module is adapted to read a priority level of the e-mail message to determine whether to check a presence of the recipient.

A telecommunications method according to an embodiment of the present invention includes receiving an e-mail at a server; using an e-mail address of the e-mail to check a presence status of a recipient of an e-mail; sending a presence confirmation message to the recipient responsive to determining that the recipient is present; and delivering the e-mail to the recipient if a response to the presence confirmation message is received. In certain embodiments, the presence confirmation message is an instant messaging message.

A better understanding of these and other specific embodiments of the invention is obtained when the following detailed description is considered in conjunction with the following drawings.

DETAILED DESCRIPTION OF EMBODIMENTS OF THE INVENTION

Figure 1:
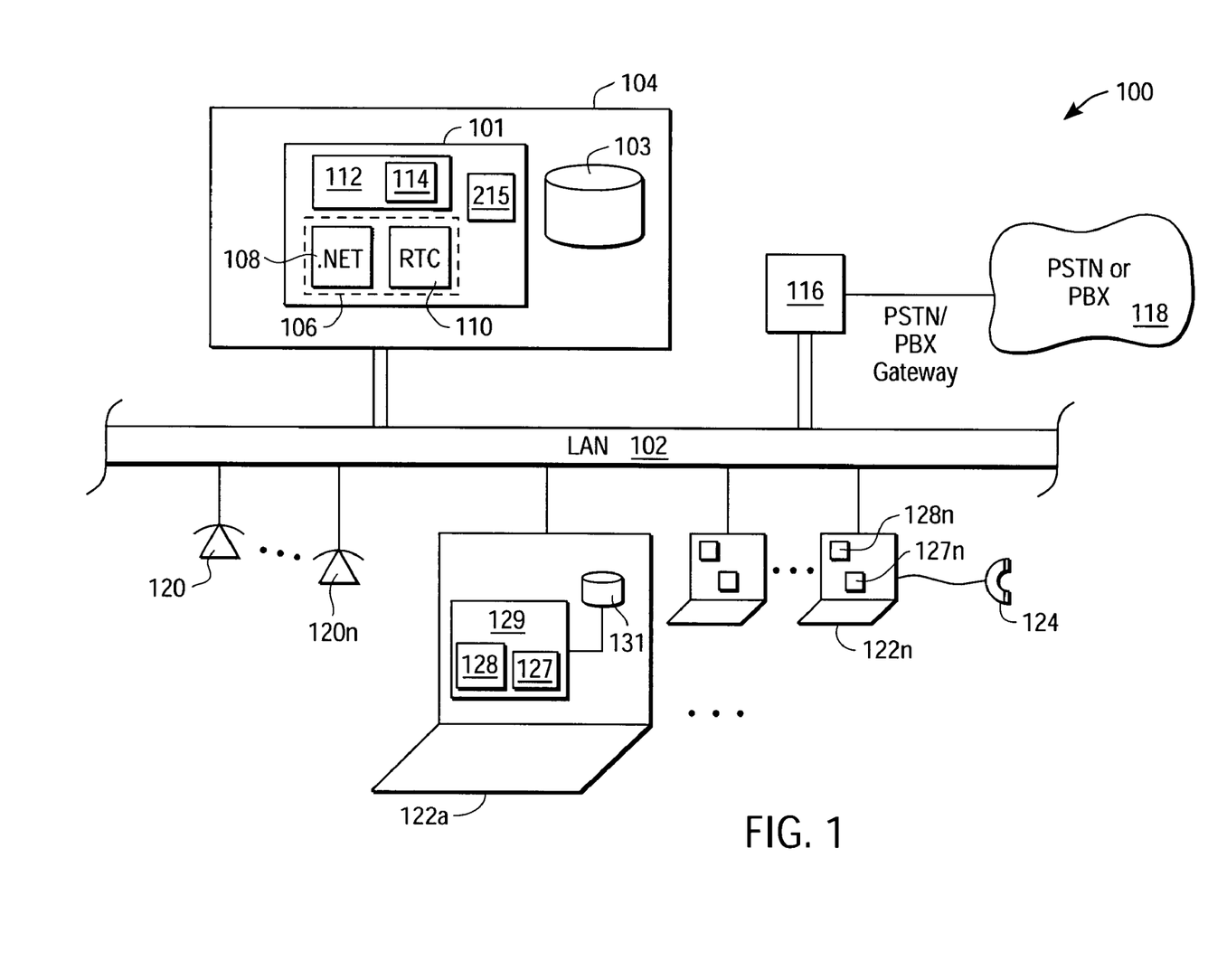
FIG. 1 is a diagram of a telecommunication system according to an embodiment of the present invention.

Turning now to the drawings and, with particular attention to FIG. 1, a diagram of an exemplary telecommunications system 100 according to an embodiment of the present invention is shown. It is noted that, while a particular network configuration is illustrated, the present invention is not so limited. Thus, the figures are exemplary only.

As shown, the telecommunications system 100 includes a packet network such as a local area network (LAN) 102. The LAN 102 may be implemented using a TCP/IP network and may implement voice or multimedia over IP using, for example, the Session Initiation Protocol (SIP). Operably coupled to the local area network 102 is a multimedia server 104. The multimedia server 104 may include one or more controllers 101, which may be embodied as one or more microprocessors, and memory 103 for storing application programs and data. The controller 101 implements an instant messaging system 106. The instant messaging system may be embodied as Microsoft Windows Messenger or other instant messaging system. Thus, according to certain embodiments of the present invention, the instant messaging system 106 implements the Microsoft.Net environment 108 and Real Time Communications protocol (RTC) 110.

In addition, according to embodiments of the present invention, an e-mail message presence activation system 114 may be provided, which may be part of an interactive suite of applications 112, run by controller 101, and typically stored in memory 103, as will be described in greater detail below. The e-mail message presence system 114 is used to determine whether a determination of recipient presence is required. The multimedia server 104 may also implement a presence server or module 215 in association with or distinct from the instant messaging system 106.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102.

The computers 122a-122n may be personal computers implementing the Windows XP operating system and thus, Windows Messenger. In addition, the computers 122a-122n may include telephony and other multimedia messaging capability using, for example, peripheral cameras, microphones and speakers (not shown) or peripheral telephony handsets 124. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium-type microprocessors, and storage 131 for applications and other programs.

Finally, the computers 122a-122n and specifically, the controllers 129, may implement e-mail or messaging clients 127a-127n and Presence Services 128a-128n according to embodiments of the present invention. As will be described in greater detail below, according to embodiments of the present invention, the Presence Services 128 allow access to the e-mail message presence activation system 114 and the presence system 215 of the server 104 and thus permit the user to determine if an e-mail recipient is present. The Presence Services 128 may be implemented in conjunction with Instant Messaging applications and the Presence Server 215.

Figure 2:
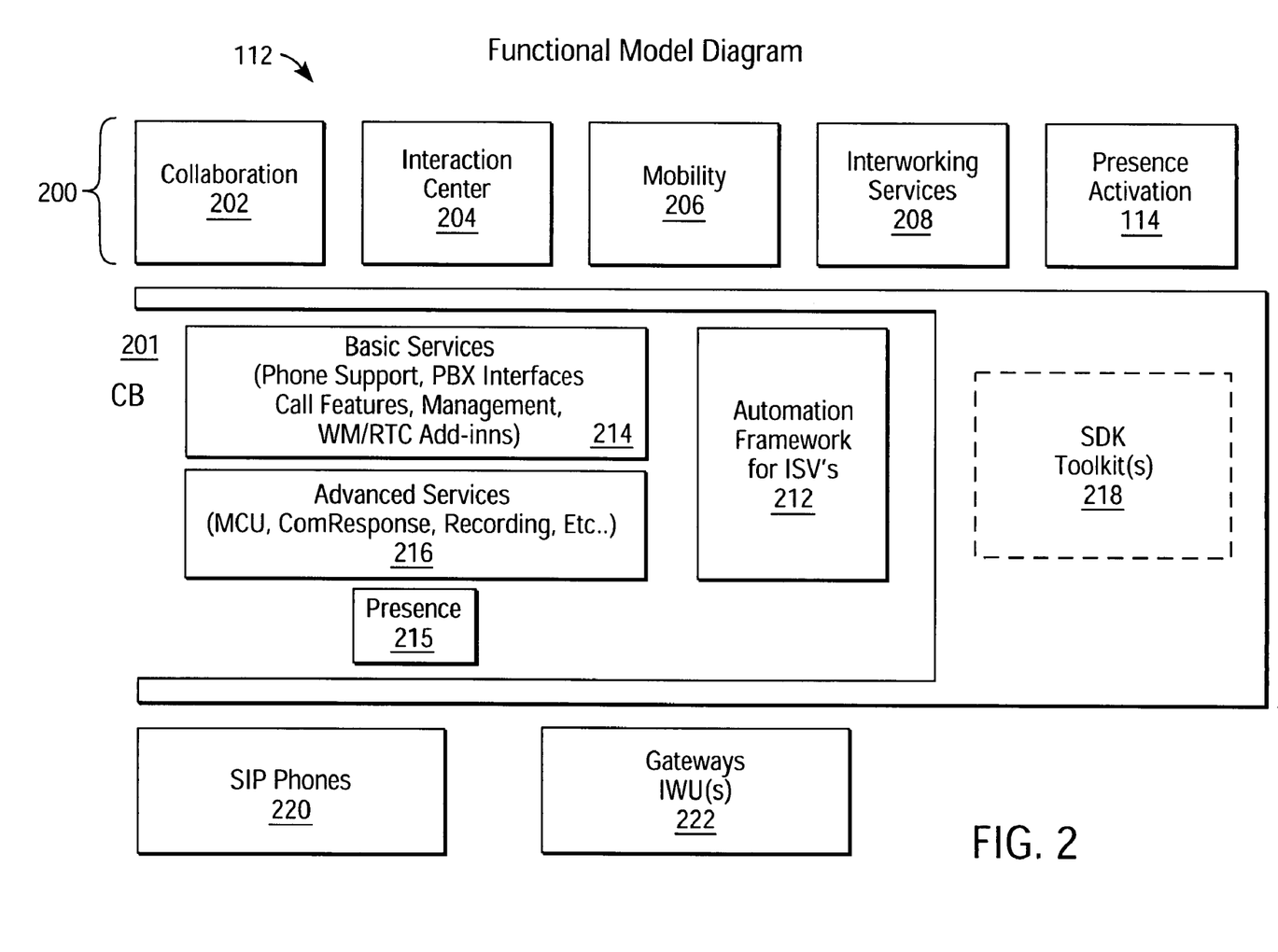
FIG. 2 is a diagram illustrating a telecommunications collaboration system according to an embodiment of the present invention.

Turning now to FIG. 2, a functional model diagram illustrating e-mail message presence activation system 114 is shown. More particularly, FIG. 2 is a logical diagram illustrating a particular embodiment of a multimedia server 104. For sake of simplicity, the Instant Messaging system 106 (FIG. 1) is omitted. The server 104 includes a plurality of application modules 200 and a communication broker module 201. The server 104 also provides interfaces, such as APIs (application programming interfaces) to SIP phones 220 and gateways/interworking units 222. Typically, such application modules are stored in memory 103 and executed by the controller 101 (FIG. 1).

According to the embodiment illustrated, the broker module 201 includes a basic services module 214, a presence module or server 215, an advanced services module 216, an automation module 212, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists.

The advanced services module 216 implements function such as multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

The presence module 215 provides a user interface for presenting the user with presence information. The presence server 215 is adapted to determine a presence of an e-mail recipient in response to requests from the e-mail message presence system 114. It is noted that, while shown as integrated with the multimedia server 112, the presence server 215 may also be implemented as a separate unit. Further, in other embodiments, either or both of the multimedia server 104 and the presence server 215 may be services provided on or via the PSTN 118 rather than provided on the LAN 102. Thus, the figures are exemplary only. An aspect of the presence features may employ Instant Messaging buddy lists to determine a recipient's presence. In addition, the presence features module 215 may operate in conjunction with the Instant Messaging system 106 to generate a presence confirmation message.

The presence module or presence features 215 may additionally provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence features module 215 enables real time call control using presence information, e.g., to choose a destination based on the presence of a user's devices. In addition, various components have a central repository for presence information and for changing and querying presence information.

In addition, the broker module 201 may include the ComResponse platform, available from Siemens Information and Communication Networks, Inc. ComResponse features include speech recognition, speech-to-text, and text-to-speech, and allow for creation of scripts for applications.

Real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules include collaboration module 202, an interaction center module 204, a mobility module 206, an interworking services module 208, and an e-mail presence activation module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, as will be explained in greater detail below, the e-mail message presence activation module 114 and the presence module 215, may be used in conjunction with the user's e-mail system and presence system 128 to determine if an e-mail recipient is present to receive the e-mail.

It is noted that, while illustrated as a single server, the presence module 215 may be separate from the multimedia server 104. In addition, it is noted that other server configurations are possible. For example, the e-mail presence activation module could function in conjunction with a server such as Microsoft Exchange server.

Figure 3:
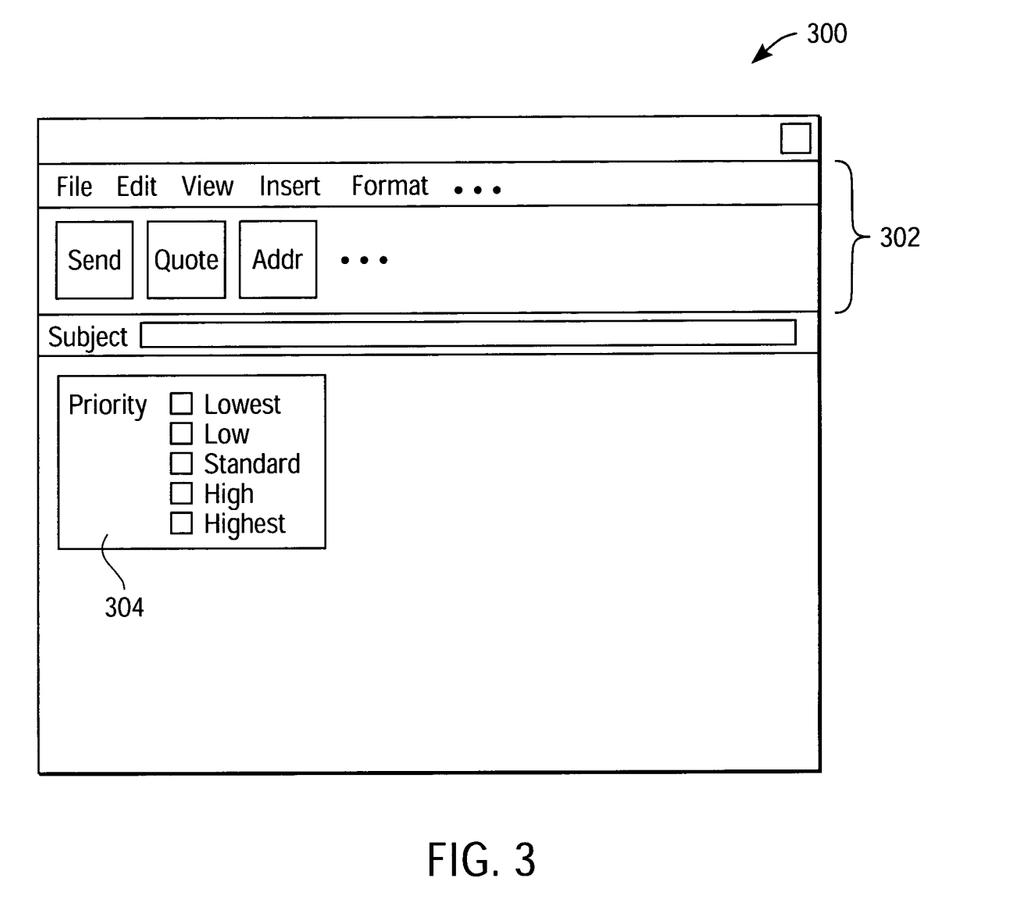
FIG. 3 is a diagram illustrating a graphical user interface according to an embodiment of the present invention.

Turning now to FIG. 3, a diagram of an exemplary graphical user interface according to embodiments of the present invention is shown. In particular, shown in FIG. 3 is an exemplary e-mail window 300. The e-mail window 300 is typically generated by the e-mail or messaging client 129 (FIG. 1). The e-mail window 300 includes a plurality of standard controls 302, such as FILE, EDIT, SEND, etc. In addition, a priority options window or dropdown 304 may be provided. Such functionality is known and may be implemented in such e-mail clients as Microsoft Outlook or Netscape Communicator. In the embodiment illustrated, the e-mail may be marked as having LOWEST, LOW, STANDARD, HIGH, and HIGHEST priority levels. It is noted that, in other embodiments, numerical scales or other levels may be provided.

As will be explained in greater detail below, in certain embodiments of the present invention, the user can mark one of the priority levels above a threshold (e.g., HIGH or HIGHEST). The marked priority is read by a destination multimedia server 104 and indicates that the server is to determine a presence of the recipient prior to delivery of the message. It is noted that a destination multimedia server and a destination presence server may be coupled to the same network as a message sender and a recipient or may be remote from one or the other. In the discussion that follows, intervening gateways and networks are omitted for sake of simplicity.

Figure 4A:
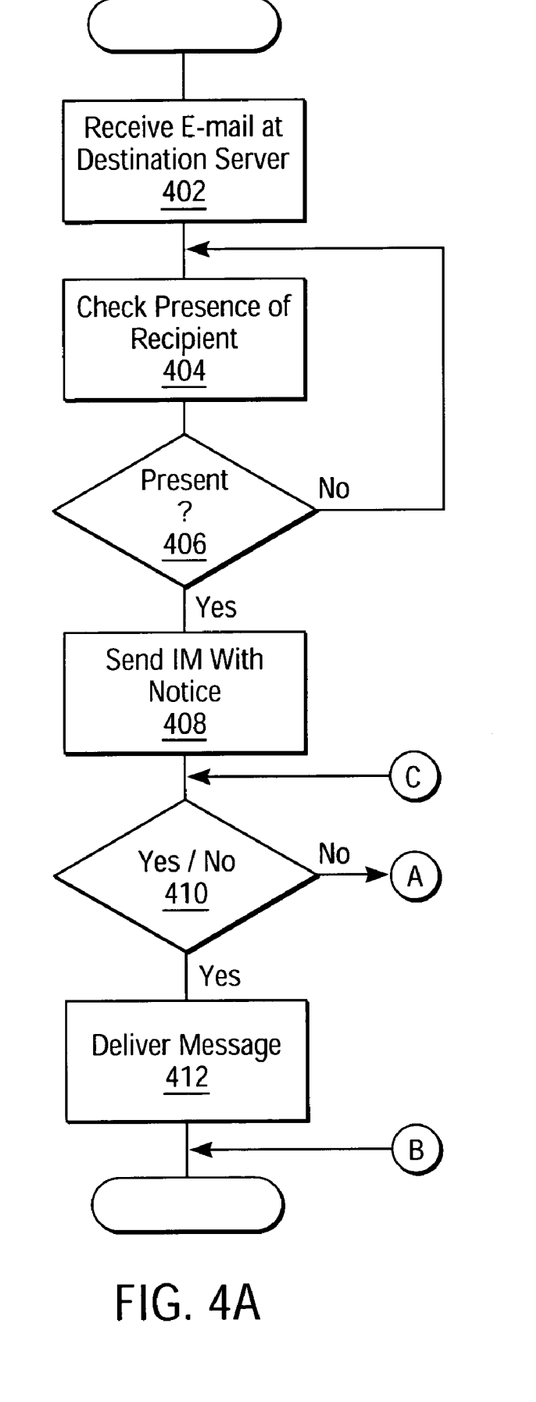
FIG. 4A-FIG. 4C are flowcharts illustrating operation of an embodiment of the present invention.
Figure 4B:
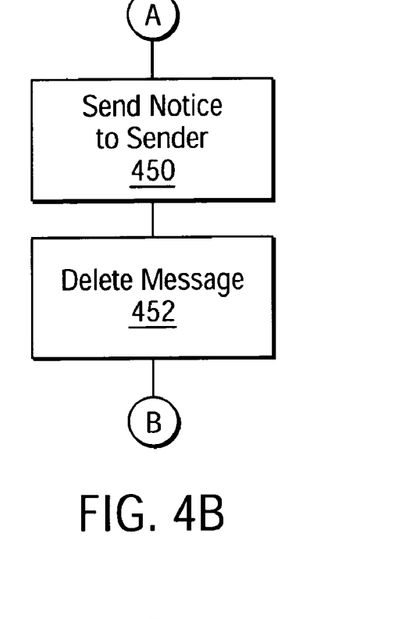
Figure 4C:
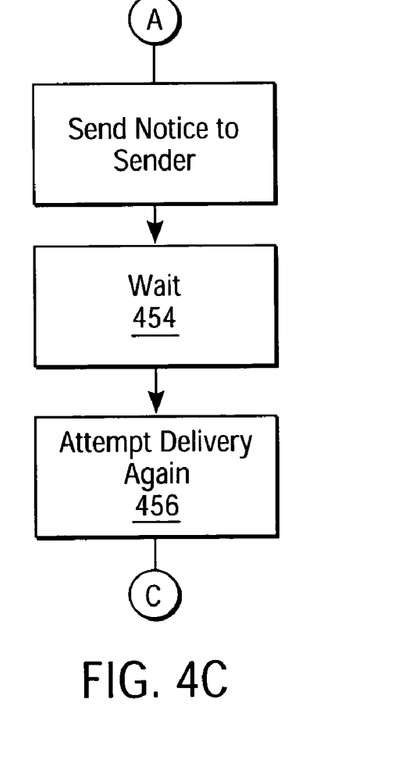

Turning now to FIG. 4A-FIG. 4C, flowcharts illustrating operation of an embodiment of the present invention are shown. In particular, FIG. 4A illustrates a primary method, and FIGS. 4B-4C illustrate notice options.

At step 402, a destination messaging server receives an e-mail from a sender and, in certain embodiments, determines that a priority threshold is above a certain predetermined level. At step 404, the destination messaging server has the presence server check a presence of the recipient. In step 406, if the recipient is not present, the server will periodically check again. If the recipient is found to be present, then in step 408, the destination messaging server will send a message such as an Instant Messaging message to the recipient. The Instant Messaging message indicates that an important message is incoming and asks whether the recipient would like to receive it. If the user responds with a YES, then in step 412, the message is delivered. If the recipient replies with a "NO", then the system can respond in a variety of ways, such as those shown in FIG. 4B and FIG. 4C.

For example, in FIG. 4B, at step 450, the system can send a notice to the sender that the recipient has declined to receive the message. The server can then delete the message, in step 452 (The system may also attempt one or more additional re-tries before deleting.). Alternatively, in FIG. 4C, the system can send a notice (e.g., either an e-mail or an IM message) to the sender in step 453 and then wait a predetermined period, in step 454. The messaging server will attempt to deliver the message again after the time expires, and send a new confirmation message, in step 456. If the recipient does not respond again with a YES, then the message can be deleted and the user notified, as in FIG. 4B.

Figure 5:
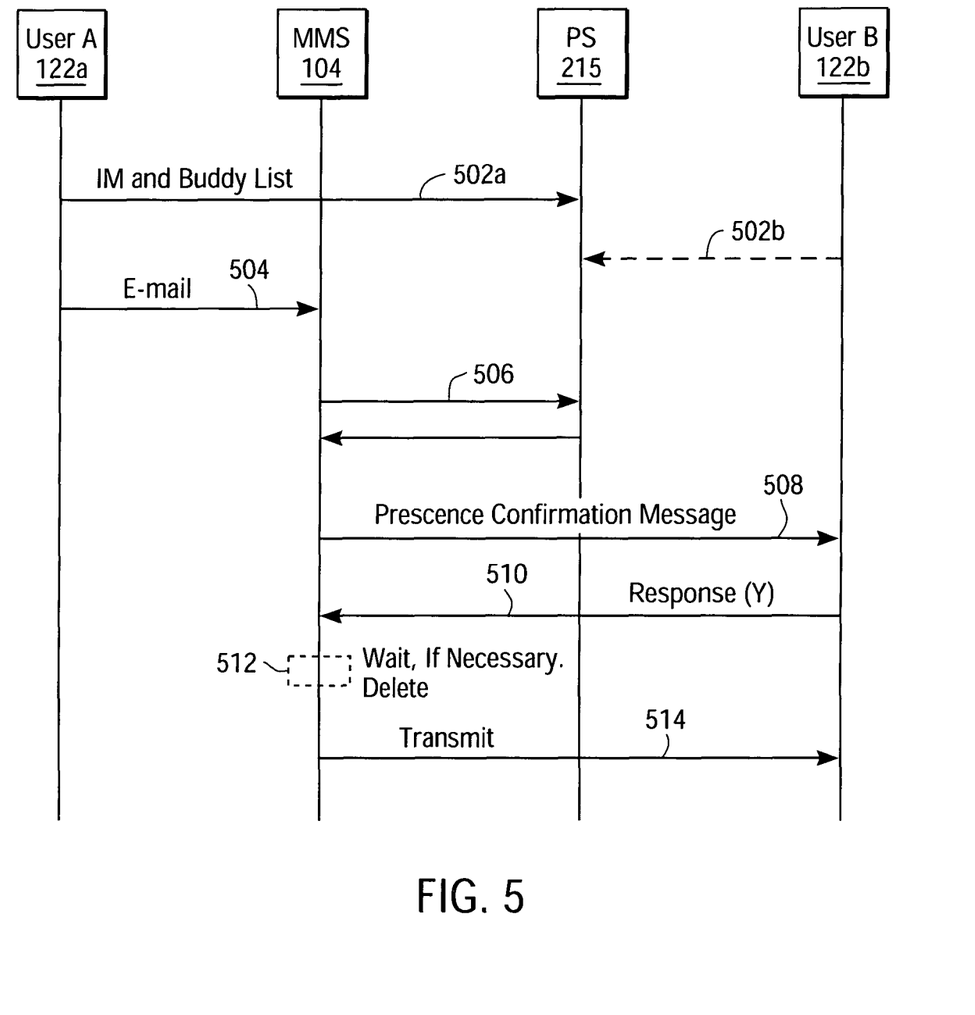
FIG. 5 is a signaling diagram illustrating operation of an embodiment of the present invention.

FIG. 5 is a signaling diagram illustrating the confirmation message signaling according to an embodiment of the present invention. Shown are a sender 122a, a destination multimedia server 104, a destination presence server 215, and a recipient 122b. As shown, at 502a and 502b, the sender 122a and the recipient 122b log in to their presence server 215 with their Instant Messaging software, which may be implemented using their presence modules 128 (FIG. 1). At this time, in certain embodiments, they transmit their buddy lists and receive an indication of the presence of their "buddies" from the Instant messaging system 106 (FIG. 2). Next, at 504, using his e-mail module 127, the sender 122a composes and transmits an e-mail to the recipient 122b; the e-mail arrives at the destination multimedia server 104. In certain embodiments, the destination multimedia server 104 reads the priority level of the message; if the priority is above a threshold, the destination multimedia server's e-mail presence activation module 114 begins to determine a presence of the recipient 122b. At 506, the destination multimedia server 104 and, in particular, the e-mail presence activation module 114, queries the presence server 215 as to the presence of the recipient. The presence server 215 thus receives the e-mail address of the recipient and checks its database of active users, for example, by checking who has logged in to an Instant Messaging system. If the presence server 215 responds to indicate that the recipient is present, then at 508, the multimedia server 104 transmits (or causes transmission of) a presence confirmation message to the recipient. At 510, the recipient 122b can respond with an affirmative to the multimedia server 104. For example, the recipient can compose a reply Instant Messaging message. If the response is affirmative, then the e-mail message is delivered, as shown at 514. If the response at 510 is in the negative, then at 512, the server will wait and, if necessary, delete the e-mail.

In certain embodiments of the present invention, a recipient of an e-mail is not necessarily on the sender's buddy list when the e-mail is transmitted. However, embodiments of the present invention are configured to read the recipient's e-mail and add the recipient to an active buddy list (either the sender's or a "server" buddy list) to determine a presence of the recipient. This shown with reference to the flowchart of FIG. 6 and the schematic diagram of FIG. 7.

Figure 6:
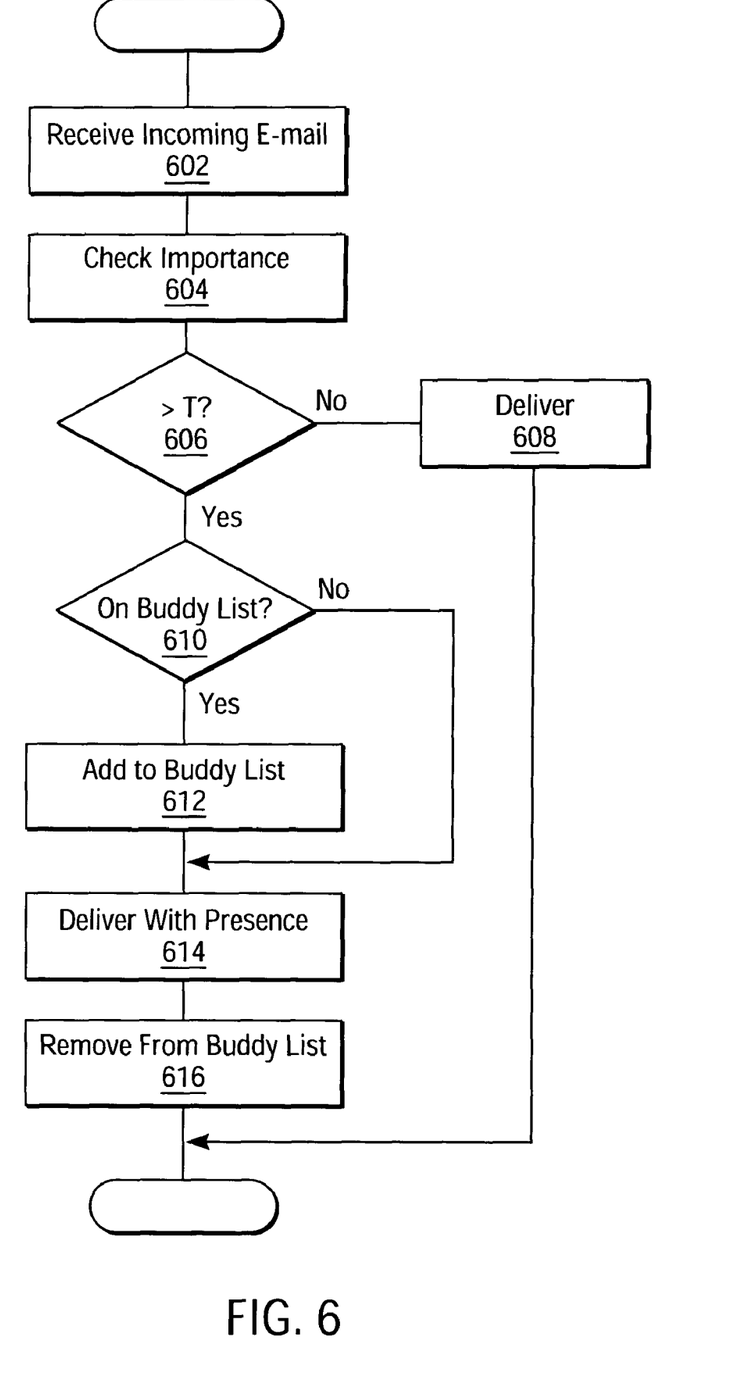
FIG. 6 is a flowchart illustrating operation of an embodiment of the present invention.
Figure 7:
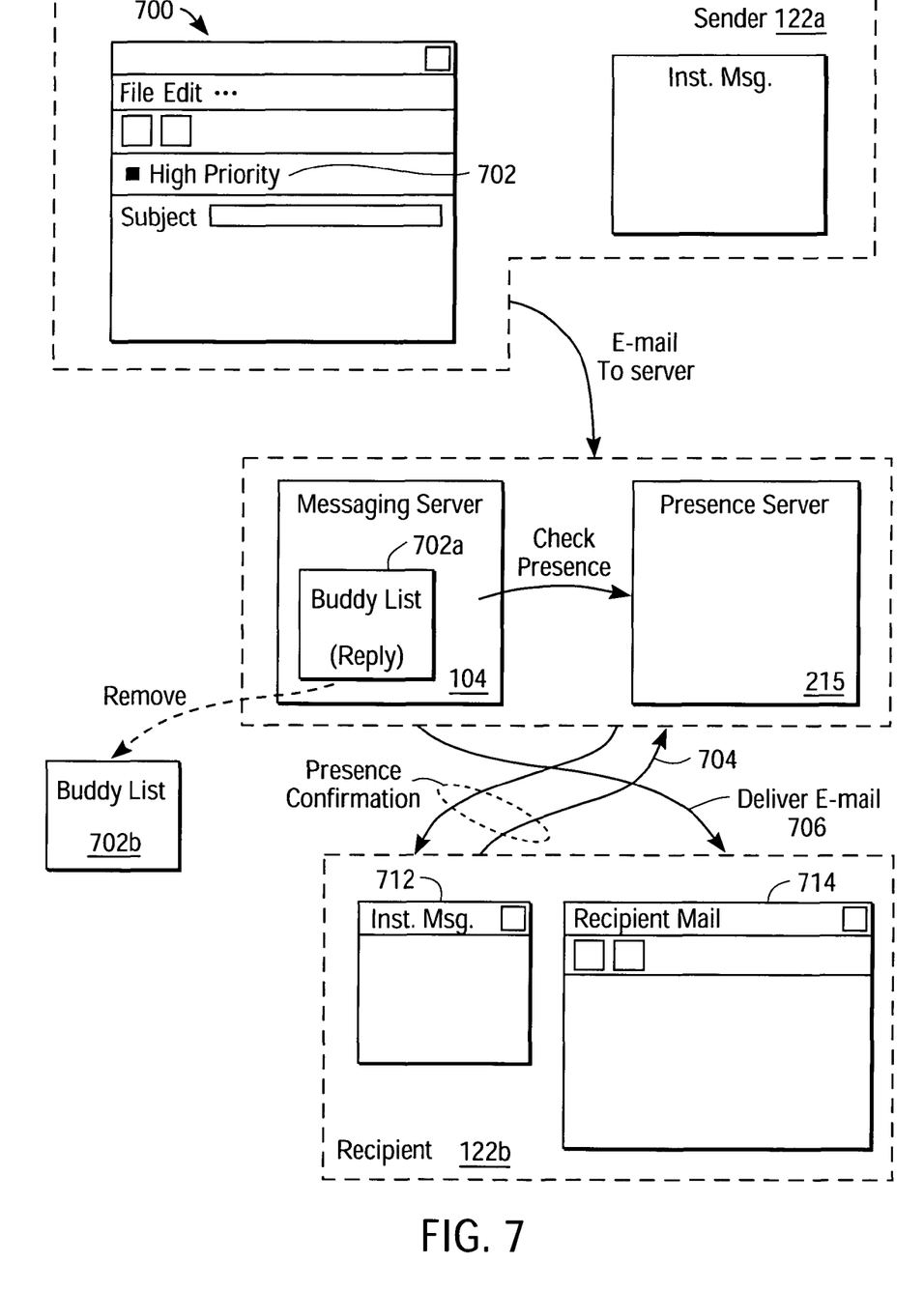
FIG. 7 is a diagram schematically illustrating operation of an embodiment of the present invention.

Initially, the sender 122a can compose an e-mail 700 (FIG. 7) and select HIGH PRIORITY 702, using the e-mail client software 127 (FIG. 1). The e-mail 700 arrives at the destination messaging server 104 in step 602 (FIG. 6, FIG. 7). Next, in step 604, the destination messaging server 104 checks the message's importance, i.e., reads the priority level. If the priority level is not above a threshold priority, as determined in step 606, then the message is delivered to the recipient 122b in a standard fashion in step 608. Otherwise, the messaging server 104 and, particularly, the e-mail presence activation module 114, uses the recipient's e-mail address and determines if the recipient is on the sender's buddy list, at step 610. If not, then in step 612, the messaging server 104 and, in particular, the e-mail presence activation module 114, will add the recipient 122b to either the sender's buddy list or a messaging server buddy list 702a, depending on the embodiment. The buddy list with the recipient is communicated to the presence server 215, which checks the recipient's presence, for example, by determining if the recipient is signed in the Instant Messaging system. The e-mail message will be delivered using the presence confirmation technique discussed above, at step 614. For example, as shown in FIG. 7, the presence server 215 can cause the Instant messaging system 106 to generate presence confirmation message 712 to the recipient 122*b*. Finally, at step 616 (FIG. 6), the recipient 122*b* is removed from the buddy list, as shown at 702*b* in FIG. 7.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
   receiving an e-mail at a server;
   reading, by the server, a priority level of the e-mail;
   if the priority level is above a predetermined threshold and recipient of said e-mail is a client of a presence service, determining a presence status of the recipient of the e-mail using an e-mail address of said e-mail;
   sending a presence confirmation message to said recipient responsive to determining that said recipient is present;
   delivering said e-mail to said recipient if a response message to said presence confirmation message is received; and
   notifying a sender of said e-mail if said response message to said presence confirmation message is not received.

2. The telecommunications method in accordance with claim 1, wherein said using said e-mail address comprises adding said recipient, by using said e-mail address, to a sender's buddy list and said presence confirmation message comprises an instant messaging message.

3. The telecommunications method in accordance with claim 2, further comprising removing said recipient from said sender's buddy list after said e-mail has been delivered.

4. The telecommunications method in accordance with claim 1, further comprising reading a priority level of said e-mail to determine whether to check a presence of said recipient.

5. The telecommunications method in accordance with claim 1, further comprising holding entire said e-mail at said server if said recipient is identified as not present.

6. A telecommunications server, comprising:
   a memory configured to store an e-mail presence activation module, a presence module, a delivery module, and a notification module; and
   one or more controllers in communication with the memory for executing the e-mail presence activation module, the presence module, the delivery module, and the notification module,
      wherein the e-mail presence activation module is configured to receive an e-mail from a sender and read therefrom a priority level of the e-mail;
      wherein the presence module is responsive to controls from said e-mail presence activation module and configured to determine a presence of a recipient of said e-mail prior to sending said e-mail to said recipient if the priority level is above a predetermined threshold and said recipient is a client of a presence service;
      wherein the presence module sends a presence confirmation message to said recipient responsive to determining that said recipient is present;
      wherein the delivery module delivers said e-mail to said recipient if a response message to said presence confirmation message is received; and
      wherein the notification module notifies said sender of said e-mail if said response message to said presence confirmation message is not received.

7. The telecommunications server in accordance with claim 6, said e-mail presence activation module configured to determine from said e-mail whether a presence of said recipient is to be determined by request of a sender.

8. The telecommunications server in accordance with claim 6, wherein said presence confirmation message comprises an instant messaging message.

9. The telecommunications server in accordance with claim 6, wherein said presence module is configured to add said recipient to a sender's buddy list prior to sending said presence confirmation message.

10. The telecommunications server in accordance with claim 6, wherein said presence module is configured to provide a signal to deliver said e-mail if a response to said presence confirmation message is received from said recipient.

11. The telecommunications server in accordance with claim 9, wherein said presence module is configured to remove said recipient from said buddy list when said e-mail is delivered to said recipient.

12. A telecommunications system, comprising:
    a plurality of electronic messaging clients; and
    at least one messaging server, said at least one messaging server comprising:
       a memory configured to store an e-mail presence activation module, a presence module, a delivery module, and a notification module; and
       one or more controllers in communication with the memory for executing the e-mail presence activation module, the presence module, the delivery module, and the notification module,
          wherein the e-mail presence activation module is configured to receive an e-mail from a sender and read therefrom a priority level of the e-mail;
          wherein the presence module is responsive to controls from said e-mail presence activation module and configured to determine a presence of a recipient of said e-mail prior to sending said e-mail to said recipient if the priority level is above a predetermined threshold and said recipient is a client of a presence service,
          wherein the presence module sends a presence confirmation message to said recipient responsive to determining that said recipient is present;
          wherein the delivery module delivers said e-mail to said recipient if a response message to said presence confirmation message is received; and
          wherein the notification module notifies said sender of said e-mail if said response message to said presence confirmation message is not received.

13. The telecommunications system in accordance with claim 12, said e-mail presence activation module configured to determine from said e-mail whether the e-mail includes a request by the sender that a determination of a presence of said recipient is to be made.

14. The telecommunications system in accordance with claim 13, wherein said presence confirmation message comprises an instant messaging message.

15. The telecommunications system in accordance with claim 13, wherein said presence module is configured to add said recipient to a sender's buddy list prior to sending presence confirmation message.

16. The telecommunications system in accordance with claim 13, wherein said presence module is configured to provide a signal to deliver said e-mail if a response to said presence confirmation message is received from said recipient.

17. The telecommunications system in accordance with claim 15, wherein said presence module is configured to remove said recipient from said buddy list when said e-mail is delivered to said recipient.

18. A telecommunications method, comprising:
providing a plurality of electronic messaging clients;
providing at least one messaging server, said at least one messaging server comprising:
an e-mail presence activation module configured to receive an e-mail from a sender and read therefrom a priority level of the e-mail; and
a presence module responsive to controls from said e-mail presence activation module and configured to determine a presence of a recipient of said e-mail prior to sending said e-mail to said recipient if the priority level is above a predetermined threshold and said recipient is a client of a presence service,
wherein the presence module sends a presence confirmation message to said recipient responsive to determining that said recipient is present;
a delivery module configured to deliver said e-mail to said recipient if a response message to said presence confirmation message is received; and
a notification module configured to notify said sender of said e-mail if said response message to said presence confirmation message is not received.

19. The telecommunications method in accordance with claim 18, said e-mail presence activation module configured to determine from the e-mail whether the e-mail includes a request by the sender that a determination of a presence of the recipient is to be made.

20. The telecommunications method in accordance with claim 19, wherein said presence confirmation message comprises an instant messaging message.

21. The telecommunications method in accordance with claim 19, wherein said presence module is configured to add said recipient to a sender's buddy list prior to sending presence confirmation message.

22. The telecommunications method in accordance with claim 19, wherein said presence module is configured to provide a signal to deliver said e-mail if a response to said presence confirmation message is received from said recipient.

23. The telecommunications method in accordance with claim 21, wherein said presence module is configured to remove said recipient from said buddy list when said e-mail is delivered to said recipient.

24. A telecommunication method for providing a server, comprising:
providing an e-mail presence activation module configured to receive an e-mail from a sender and read therefrom a priority level of the e-mail; and
providing a presence module responsive to controls from said e-mail presence activation module and configured to determine a presence of a recipient of said e-mail prior to sending said e-mail to said recipient if the priority level is above a predetermined threshold and said recipient is a client of a presence service,
wherein the presence module sends a presence confirmation message to said recipient responsive to determining that said recipient is present;
providing a delivery module configured to deliver said e-mail to said recipient if a response message to said presence confirmation message is received; and
providing a notification module configured to notify said sender of said e-mail if said response message to said presence confirmation message is not received.

25. The telecommunications method in accordance with claim 24, said e-mail presence activation module configured to determine from the e-mail whether a presence of the recipient is to be determined by request of a sender.

26. The telecommunications method in accordance with claim 25, wherein said presence confirmation message comprises an instant messaging message.

27. The telecommunications method in accordance with claim 25, wherein said presence module is configured to add said recipient to a sender's buddy list prior to sending said presence confirmation message.

28. The telecommunications method in accordance with claim 25, wherein said presence module is configured to provide a signal to deliver said e-mail if a response to said presence confirmation message is received from said recipient.

29. The telecommunications method in accordance with claim 27, wherein said presence module is configured to remove said recipient from said buddy list when said e-mail is delivered to said recipient.

30. A telecommunications method, comprising:
receiving an e-mail at a server;
reading, by the server, a priority level of the e-mail;
if the priority level is above a predetermined threshold, using an e-mail address of said e-mail to check a presence status of a recipient of an e-mail;
sending a presence confirmation message to said recipient responsive to determining, by said using said e-mail address of said e-mail, that said recipient is present and said recipient is a client of a presence service, said presence confirmation message offering the recipient an option to accept or decline to receive the e-mail;
if an accept response message to said presence confirmation message is received, delivering said e-mail to said recipient; and
if a decline response message is received, waiting for predetermined period of time before attempting to deliver the e-mail and sending a new presence confirmation message.

* * * * *